May 22, 1956  C. F. FLEMING  2,746,790
COLLAPSIBLE ANTI-GLARE DEVICE FOR MOUNTING ON A WINDSHIELD
Filed April 22, 1953
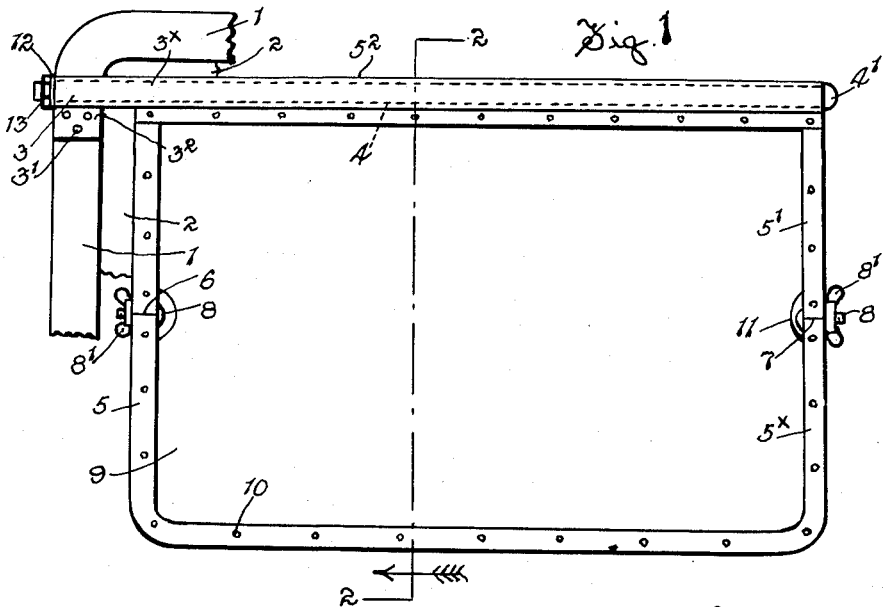
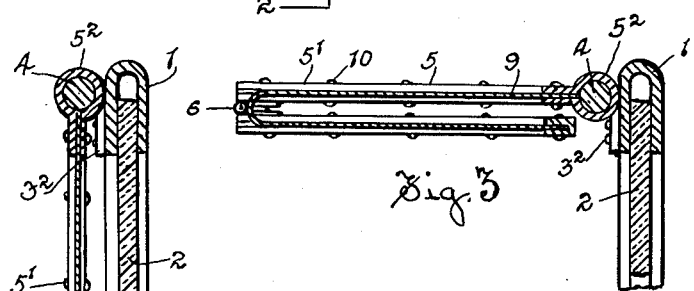
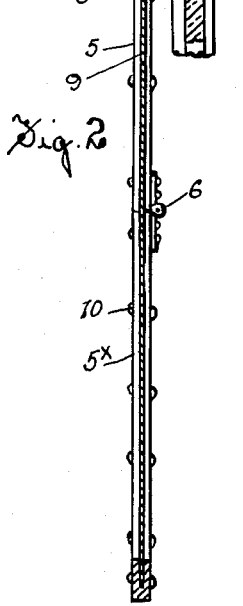
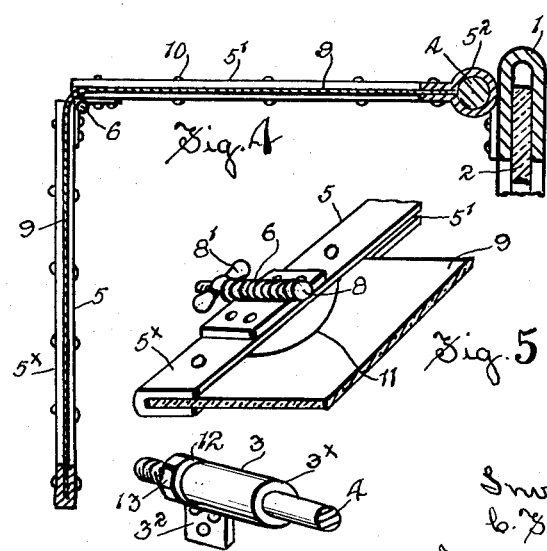
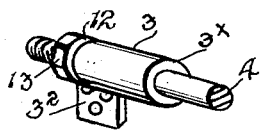
Inventor
C. F. Fleming
By J. S. Roxburgh
His Atty

United States Patent Office 2,746,790
Patented May 22, 1956

2,746,790
COLLAPSIBLE ANTI-GLARE DEVICE FOR MOUNTING ON A WINDSHIELD

Charles F. Fleming, Regina, Saskatchewan, Canada

Application April 22, 1953, Serial No. 350,396

2 Claims. (Cl. 296—97)

The device relates to anti-glare devices designated for mounting on cars, trucks and such like vehicles to permit the driver to dissipate glare with the intention of reducing road accidents and eye strain and an object of the invention is to provide an anti-glare device which can be made at small expense, easily and quickly mounted in respect to the existing windshield frame of a vehicle, folded or extended to best suit driving conditions and which in all working conditions will dissipate by a visor, the glare of the sun or the glare of the headlights of an approaching vehicle.

A more detailed object is to provide an anti-glare device presenting a substantially rectangular frame having upper and lower sections hingedly secured together and with the upper frame section pivotally mounted, and the frame sections containing a one piece flexible visor formed from coloured plastic to dissipate glare, said plastic being mounted in the frame so that it can centrally fold in the adjustment of the frame sections.

A further object is to provide suitable means for adjusting the extent of friction at the pivotal points of the sections so that the said sections can be caused to remain in any turned positions in which it is desired to set them.

A further object is to provide a construction which permits the device to be quickly mounted or dismounted for repair, inspection or other purposes.

With the above objects in view the invention consists in the arrangement and construction of parts hereinafter described, reference being had to the accompanying drawing in which:

Fig. 1 is an interior view of the device as it appears associated with the frame of an existing windshield and showing it in its fully extended position.

Fig. 2 is an enlarged vertical sectional view at 2—2 Fig. 1 and looking in the direction of the applied arrow.

Fig. 3 is a sectional view similar to Fig. 2 but with the device shown in its fully up position.

Fig. 4 is a sectional view similar to Fig. 3 but with one section of the visor frame in a horizontal position and the other section in a down hanging vertical position.

Fig. 5 is an enlarged perspective view of the hinge connecting the visor frame sections together.

Fig. 6 is a perspective view of the bearing bracket for the rod and showing part of the rod and other associated parts.

In the drawing like characters of reference indicate corresponding parts in the several figures.

A small portion of the conventional windshield frame is indicated by the reference numeral 1 and such frame contains the usual windshield glass 2.

My device is secured to the upper corner of the frame 1 in advance of the drivers seat and embodies the parts now described.

A suitable bracket 3 is firmly fastened as by screws 3' to the upper left hand corner of the frame 1, such bracket being herein shown as embodying a horizontally disposed sleeve $3^x$ supplied with an extending base lug $3^2$ for attaching purposes. The sleeve receives the one end of a rod or shaft 4 which extends half way across the windshield and has its outer end terminating in a retaining head 4'.

On the rod or shaft I mount rotatably a substantially rectangular frame 5 formed from upper and lower sections 5' and $5^x$ hingedly connected together at 6 and 7 and approximately the same size. The hinges are herein shown as each supplied with a hinge pin 8 provided with a winged nut 8' so that one can adjust the nut and by so doing increase the friction in the hinge and thereby cause the sections to remain in any relative position in which they are set, by hand manipulation.

The frame is made up of folded bars presenting opposing edges between which the edges of a rectangular, flexible, sheet of plastic 9 is entered, such forming a visor to dissipate light to kill glare. Spaced pins or screws 10 effectively hold the sheet, flat lying, in the frame.

The upper part of the frame section 5' is additionally shaped to provide a tube $5^2$ which is rotatably mounted on the rod 4 between the head 4' and the sleeve $3^x$ and provision is made such that the rotation of the upper frame section is frictionally resisted in order that such frame section will remain in any position to which it is turned. The way this is done may obviously vary but I have herein shown the end of the rod beyond the bearing sleeve as threaded and a split spring washer 12 and nut placed on the threaded end of the rod. Tightening up the nut will naturally increase friction and cause the upper section to remain in any set position.

In view of the disclosure it will be seen that the installed device can be manipulated to take various positions. If it is desired to cover approximately one half of the windshield it will be set as shown in Figs. 1 and 2. If it be desired to cover only the upper half of the windshield, at the left, the sections will be set as shown in Fig. 4 and if it is not desired to use the device it is folded for storing in a up position as shown in Fig. 3.

I wish it to be particularly noticed that in the area adjacent the hinges interconnecting the sections, the plastic material is cut away as indicated at 11, and such permits the plastic material to fold freely in the area between the hinges, when the sections are changed in their positions relative to one another, and this without disturbing the major areas within the sections.

While I have described the various parts in detail, it will be understood that they may be materially changed without departing from the spirit of the invention as set forth in the accompanying claims.

What I claim as my invention is:

1. The combination with the frame of a vehicle windshield, of a bearing bracket secured to one of the upper corners of the frame, a horizontally disposed rod passing across the upper part of the windshield and carried by the bracket, a tube rotatably mounted on the rod, an upper frame section including an upper cross bar underlying and secured to the tube and pendant opposing end bars secured to the upper bar, a lower frame section including a lower cross bar and upstanding end bars, all of said bars being formed to provide similar channels at the inner sides of the sections, means hingedly and adjustably connecting the end bars of the sections together and a single sheet of flexible visor forming material having its several edges received and secured within the channels, said sheet being cut away at the hinges to give clearance.

2. The device as claimed in claim 1 wherein the bracket provides a horizontal sleeve, the rod has one end threaded and passed through the sleeve and supplied with a jam nut and the extending end of the rod terminates in a head engaging the remote end of the tube.

References Cited in the file of this patent

UNITED STATES PATENTS

| | | |
|---|---|---|
| 134,409 | Whitford | Dec. 31, 1872 |
| 1,457,929 | Lippy | June 5, 1923 |
| 1,593,860 | Abraham | July 27, 1926 |
| 2,064,746 | Hawk | Dec. 15, 1936 |
| 2,238,981 | Newell | Apr. 22, 1941 |
| 2,254,647 | Gallagher | Sept. 2, 1941 |
| 2,257,612 | Linninger | Sept. 30, 1941 |